(12) United States Patent
Liu et al.

(10) Patent No.: US 12,567,828 B2
(45) Date of Patent: Mar. 3, 2026

(54) FLEXIBLE TRACKING BRACKET

(71) Applicant: Arctech Solar Holding Co., LTD,
Jiangsu (CN)

(72) Inventors: Haijun Liu, Jiangsu (CN); Ying Yang,
Jiangsu (CN)

(73) Assignee: Arctech Solar Holding Co. LTD,
Kunshan Suzhou (CN)

( * ) Notice: Subject to any disclaimer, the term of this
patent is extended or adjusted under 35
U.S.C. 154(b) by 0 days.

(21) Appl. No.: 18/840,751

(22) PCT Filed: May 31, 2023

(86) PCT No.: PCT/CN2023/097435
§ 371 (c)(1),
(2) Date: Aug. 22, 2024

(87) PCT Pub. No.: WO2024/139045
PCT Pub. Date: Jul. 4, 2024

(65) Prior Publication Data
US 2025/0183841 A1      Jun. 5, 2025

(30) Foreign Application Priority Data
Dec. 26, 2022    (CN) .......................... 202223571458.1

(51) Int. Cl.
*H02S 20/32*           (2014.01)
(52) U.S. Cl.
CPC .................................... *H02S 20/32* (2014.12)
(58) Field of Classification Search
None
See application file for complete search history.

(56) References Cited

FOREIGN PATENT DOCUMENTS

| | | | |
|---|---|---|---|
| CN | 110492838 | A | 11/2019 |
| CN | 211377955 | U * | 8/2020 |
| CN | 214480424 | U | 10/2021 |
| CN | 218829784 | U | 4/2023 |
| JP | 2018019455 | A | 2/2018 |

OTHER PUBLICATIONS

English machine translation of Yu (CN-211377955-U) provided by
the EPO website, All Pages, 2025. (Year: 2025).*

* cited by examiner

*Primary Examiner* — Daniel P Malley, Jr.
(74) *Attorney, Agent, or Firm* — Woodard, Emhardt,
Henry, Reeves & Wagner, LLP

(57)           ABSTRACT

A flexible tracking bracket, comprising: columns (1),
wherein multiple columns are spaced apart on a base sur-
face; bases (2), provided on top of each column; rotating
beams (3), pivotally arranged on the bases; flexible bearing
bodies, comprising at least two bearing cables (41) each
connected between two adjacent rotating beams, and used to
support photovoltaic modules (13); driving devices (5),
provided at each base. The driving device comprises a
driving end, which is connected to a corresponding rotating
beam. Multiple driving devices synchronously drive the
corresponding rotating beams to rotate. The disclosure has a
well-engineered configuration, a compact structure, and is
easy to install or maintain, and is not prone to jamming. It
also has a reverse self-locking function, which allows the
flexible bracket to have an angle adjustment function,
improving the power generation efficiency and profitability
of photovoltaic power plants.

8 Claims, 6 Drawing Sheets

FLEXIBLE TRACKING BRACKET

FIELD OF THE DISCLOSURE

This disclosure relates to a technical field of photovoltaic technology, specifically to a flexible tracking bracket.

BACKGROUND

In existing photovoltaic flexible brackets, most of them are fixed flexible brackets, wherein the photovoltaic modules installed on these brackets have a fixed angle relative to the ground. These brackets cannot drive the photovoltaic modules to rotate and to change their angle to track the sun's azimuth, resulting in less radiation received by the photovoltaic modules and reduced power generation.

The driving devices used in existing photovoltaic tracking brackets, such as rotary drives, are mostly mounted on a mounting seat at the top of the columns. These devices are configured to withstand significant force in the direction of gravity but cannot withstand large axial tension. The steel cables at both ends of the flexible brackets exert substantial tension on the beam. Deploying the aforementioned driving devices may reduce the driving stability and the precision of the rotation angle, potentially leading to premature failure of the driving device and to reduced service life.

SUMMARY OF THE INVENTION

This disclosure aims to solve the above issues by providing a flexible tracking bracket that effectively improves the load-bearing capacity of the rotating node, features a compact structure, and is easy to install.

The technical solution adopted in this disclosure is as follows.

A flexible tracking bracket, characterized by comprising:

columns, wherein multiple columns are spaced apart on a base surface;

bases, wherein each base is provided at a top of each column;

rotating beams, pivotally arranged on the bases;

flexible bearing bodies, comprising at least two bearing cables, wherein each end of each bearing cable is connected between two adjacent rotating beams, and the flexible bearing bodies are used to support photovoltaic modules;

driving devices, wherein each base is equipped with a driving device, and the driving device comprises a driving end, connected to a corresponding rotating beam, and multiple driving devices synchronously drive the corresponding rotating beams to rotate.

By providing the bearing cables, the bracket can meet the requirements of large spans and complex terrains. By providing the driving device, the flexible bearing body can adjust the tilt angle of the photovoltaic modules, improving the environmental adaptability and the benefits of photovoltaic power plants.

In some embodiments, the base comprises a base plate, and further comprises a first support plate and a second support plate that are both vertically arranged on two sides of the base plate; wherein the first support plate, the second support plate, and the base plate constitute a receiving cavity, and the driving device and the rotating beam are arranged within the receiving cavity, and the driving device is arranged close to the first support plate, and the rotating beam is arranged close to the second support plate; and the driving device comprises a housing, a rotating body arranged within the housing that can rotate relative to the housing, and a motor mounted on the housing, wherein the motor is used to drive the rotating body to rotate, and the housing is fixed on the first support plate, and the rotating body is connected to the rotating beam.

By arranging the rotating beams and driving devices in the receiving cavity, the installation space is minimized, the structure is compact, the components are few, and it is not easy to jam, the installation is convenient, and maintenance costs are low.

In some embodiments, the driving device comprises a rotary drive, wherein the rotary drive comprises the housing and a worm-gear mechanism arranged within the housing, and the worm-gear mechanism comprises a worm and a worm wheel meshing with the worm, and the worm wheel constitutes the rotating body, and the worm is connected to the driving end of the motor.

By deploying a worm-gear rotary drive, the radial and axial load-bearing capacity of the driving device is improved, and it has a reverse self-locking function, which can withstand lateral and vertical forces transmitted by the flexible bearing body.

In some embodiments, the first support plate, the second support plate, and the rotating beam is each provided with a through-hole wherein the through-holes are corresponding to each other, and a first bolt is inserted from one side of the first support plate sequentially into the through-hole of the first support plate, the driving device, the through-hole of the rotating beam, and the through-hole of the second support plate, and then secured, thus connecting the first support plate and the second support plate.

By connecting the first support plate and the second support plate with the first bolt, two support plates share the lateral force, improving the resistance of the base against lateral forces. The first bolt passes through the through-hole of the first support plate, the driving device, the through hole of the rotating beam, and the through hole of the second support plate, aligning the forces transmitted from the driving device's housing to the base and those transmitted by the first bolt, resulting in a minimal torque and deformation of the base, enhancing its load-bearing capacity.

In some embodiments, the through-hole of the second support plate is provided with a bearing, wherein the bearing features a bearing cavity, and a sleeve is fixed within the through-hole of the rotating beam, and two ends of the sleeve extend beyond the rotating beam, and the first bolt passes through an inside of the sleeve, and one end of the sleeve is inserted into the bearing cavity, and is configured to rotate around an axis of the through-hole of the second support plate.

By configuring the bearing and the sleeve, the first bolt only needs to bear tensile forces without vertical shear forces, simplifying the stress state and avoiding the risk of damage under complex stress conditions. The sleeve and the bearing reduce the deformation of the base and the friction with the through-hole in the second support plate during rotation, ensuring a stable and smooth rotation.

In some embodiments, the bearing comprises a circular column section and a first annular section provided on an outer wall of one end of the circular column section, wherein an outer diameter of the first annular section is greater than a diameter of the through-hole of the second support plate, and the circular column section is inserted into the through-hole of the second support plate from the receiving cavity, then one end of the sleeve is inserted into the bearing cavity, and the rotating beam and the first annular section is configured to restrict an axial movement of the bearing.

Some embodiments further comprise a diagonal cable, wherein one end of the diagonal cable is connected to the second support plate, and another end of the diagonal cable is connected to the base surface.

By providing diagonal cables, the overall tensile strength of the flexible tracking bracket is enhanced, reducing the load-bearing requirements of the columns and bases, saving materials and lowering costs.

In some embodiments, the diagonal cable is connected to the second support plate through a first connection structure and connected to the base surface through a second connection structure.

In some embodiments, the rotating body is connected to a side of the rotating beam through a connecting piece.

In some embodiments, the connecting piece is a flange, wherein one end of the flange is fixedly connected to the rotating body through one or more second bolts, and another end is welded to the side of the rotating beam.

By connecting the flange and the rotating body with second bolts, installation and disassembly are convenient. Welding the flange to the rotating beam avoids weakening the cross-sectional strength by openings in the rotating beam.

In some embodiments, the connecting piece is a hollow tube, wherein a side wall of the rotating beam facing the driving device is provided with a protrusion, and the protrusion extends into the hollow tube and is fixed by a fastener passing through the protrusion and a side wall of the hollow tube.

This disclosure provides a flexible tracking bracket with at least one of the following beneficial effects:

1. The flexible tracking bracket reduces material costs by using a flexible bearing body while allowing the bracket to adapt to larger spans and more complex terrains.
2. The flexible tracking bracket adjusts the tilt angle of the photovoltaic modules with the driving device, enhancing environmental adaptability and improving the benefits of photovoltaic power plants.
3. The flexible tracking bracket, with the rotating beam directly connected to the driving device and arranged in the receiving cavity, has a compact structure, a small footprint, few components, is not easy to jam, and is easy to install with low maintenance costs.
4. The flexible tracking bracket uses a worm-gear rotary drive to improve the radial and axial load-bearing capacity of the driving device, has a reverse self-locking function, and can withstand lateral and vertical forces transmitted by the flexible bearing body.
5. The flexible tracking bracket connects the first and second support plates with a first bolt, allowing both plates to share lateral forces, improving the base's resistance to lateral loads. The forces transmitted from the driving device's housing to the base and those transmitted by the first bolt are aligned, resulting in minimal torques and deformation, enhancing the base's load-bearing capacity.
6. The flexible tracking bracket uses the bearing and the sleeve to ensure that the first bolt only bears tensile force without vertical shear forces, simplifying the stress state and avoiding damage risk under complex stress conditions. The sleeve and the bearing reduce the deformation of the base and the friction during rotation, ensuring a stable and smooth rotation.

7. The flexible tracking bracket, with diagonal cables, enhances overall tensile strength, reduces the load-bearing requirements of the columns and bases, saves materials, and lowers costs.
8. The flexible tracking bracket connects the flange and the rotating body with second bolts for convenient installation and disassembly, and welds the flange to the rotating beam to avoid weakening the cross-sectional strength through openings.

BRIEF DESCRIPTION OF THE DRAWINGS

The preferred embodiments of a flexible tracking bracket will be further explained in a clear and understandable manner in conjunction with the accompanying drawings, illustrating the aforementioned characteristics, technical features, advantages, and implementation methods of the flexible tracking bracket.

EXPLANATION OF THE REFERENCE NUMBERS

Figure 1:
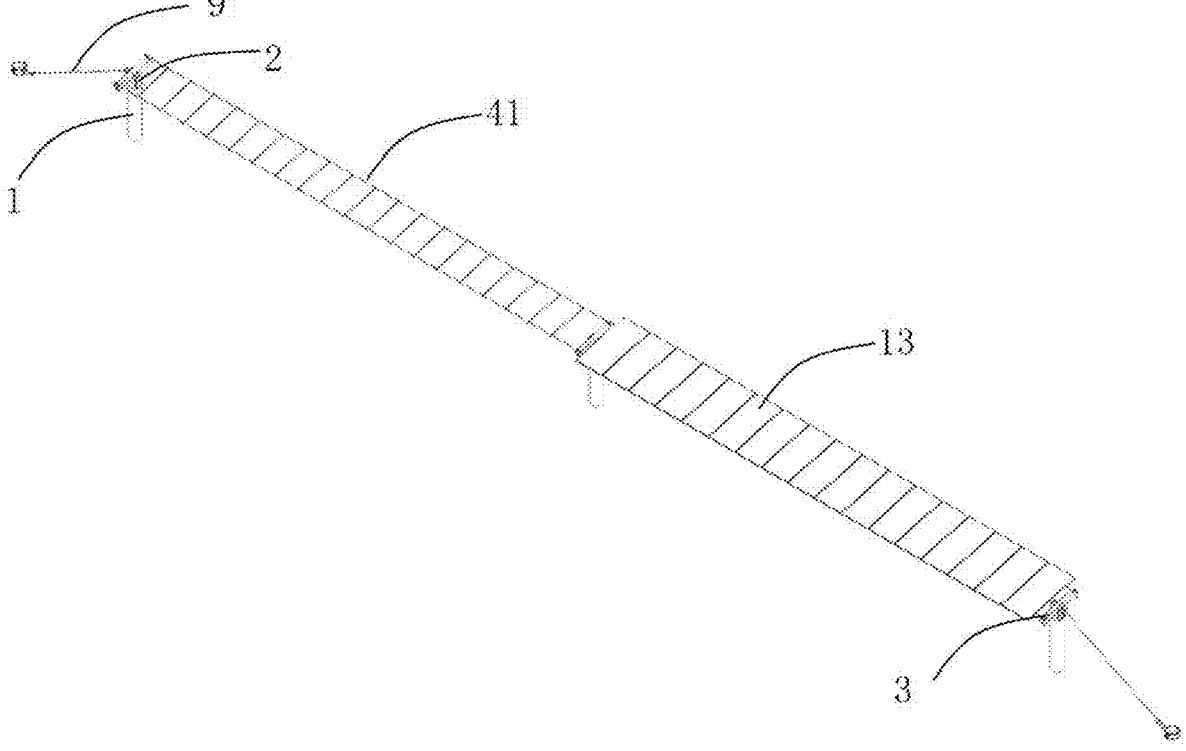
FIG. 1 is an overall structural schematic of this disclosure.

Column 1, Base 2, Base plate 21, First support plate 22, Second support plate 23, Receiving cavity 24, Through-hole 25, Rotating beam 3, Bearing cable 41, Driving device 5, Housing 51, First housing 511, Second housing 512, Rotating body 52, First bolt 6, Bearing 7, Bearing cavity 71, Circular column section 72, First annular section 73, Sleeve 8, Diagonal cable 9, First connection structure 10, Second connection structure 11, Flange 12, Photovoltaic module 13.

DESCRIPTION OF THE ILLUSTRATED EMBODIMENTS

To explain the technical solutions in the embodiments of this disclosure or the prior art more clearly, the following specific implementations are described in conjunction with the drawings. It is evident that the drawings described below are merely some embodiments of this disclosure. Those skilled in the art can obtain other drawings and implementations based on these drawings without creative effort.

For simplicity in the illustrations, only parts relevant to this disclosure are schematically shown in each figure. They do not represent the actual structure of products. Additionally, to make the drawings simple and easy to understand, some figures only schematically show one of the identical structures or functions, or only mark one of them. In this document, "one" not only means "only one" but can also indicate "more than one".

Furthermore, it should be understood that the term "and/or" used in the description and claims of this disclosure refers to any and all possible combinations of the listed items and includes such combinations.

In this document, unless otherwise specified and limited, terms like "install," "connect," and "link" should be broadly understood. For example, they can be fixed connections, detachable connections, or integral connections; mechanical or electrical connections; direct or indirect connections through intermediaries; or internal connections between two components. Those skilled in the art can understand the specific meanings of these terms in this disclosure based on specific situations.

Moreover, in the description of this disclosure, terms such as "first" and "second" are only used to distinguish descriptions and should not be understood as indicating or implying relative importance.

Referring to FIG. 1 to FIG. 6, specific embodiments of a flexible tracking bracket in this disclosure are described. The flexible tracking bracket comprises: columns 1, wherein multiple columns 1 are spaced on a base surface (not marked in the figure), which can be the top of a building, plain, hill, mountain, lake, desert, or Gobi, without being limited in this disclosure; base 2, provided at the top of each column 1; rotating beam 3, pivotally provided on base 2; flexible bearing body, comprising at least two bearing cables 41, with each end of each bearing cable 41 connected between two adjacent rotating beams 3, for carrying photovoltaic modules 13; driving device 5, installed on each base 2, comprising a driving end connected to a corresponding rotating beam 3, wherein multiple driving devices 5 synchronously drive the corresponding rotating beams 3 to rotate.

In this embodiment, the bearing cables 41 are preferably steel cables or steel strands, which have large load-bearing capacity, long service life, and low cost. The number of bearing cables can be selected based on the length of photovoltaic modules 13. The cross-sectional profile of column 1 is preferably circular for better stability.

Figure 2:
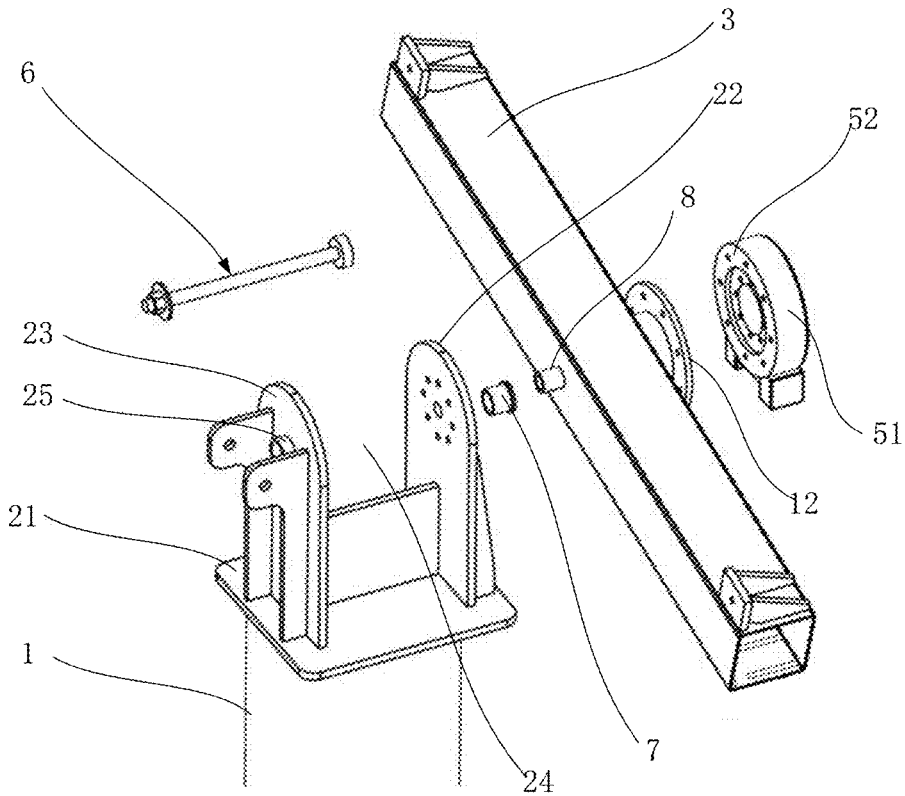
FIG. 2 is an exploded view of a node in this disclosure.
Figure 3:
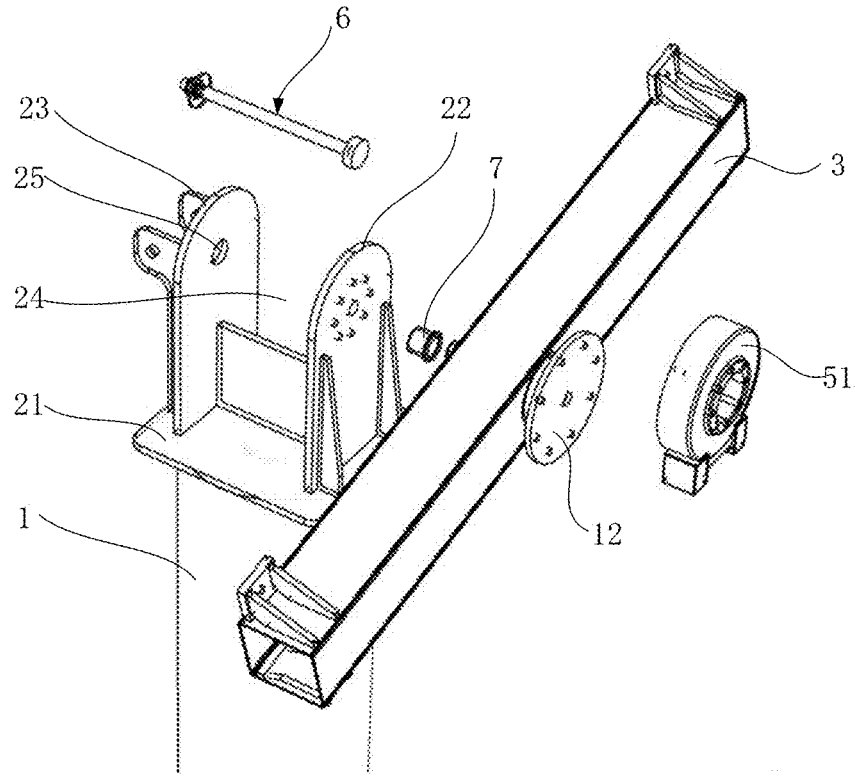
FIG. 3 is another angle of the exploded view of the node in this disclosure.
Figure 4:
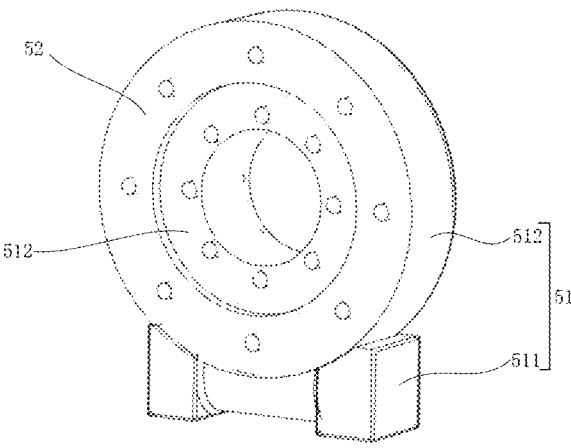
FIG. 4 is a schematic of a driving device in this disclosure.
Figure 5:
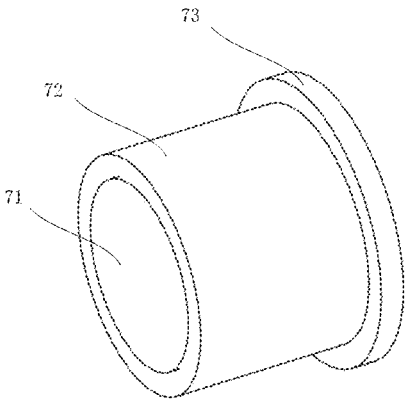
FIG. 5 is a schematic of a bearing in this disclosure.

Referring to FIG. 2 to FIG. 4, in some embodiments, the base 2 comprises a base plate 21, whereby a first support plate 22 and a second support plate 23 are vertically arranged on both sides of the base plate 21. The first support plate 22, the second support plate 23, and the base plate 21 constitute a receiving cavity 24. The driving device 5 and at least a part of the rotating beam 3 are arranged within the receiving cavity 24. The driving device 5 is arranged near the first support plate 22, and the rotating beam 3 is arranged near the second support plate 23.

The driving device 5 comprises a housing 51, a rotating body 52 which is provided within the housing 51 and is configured to rotate relative to the housing 51, and a motor installed on the housing 51. The motor is used to drive the rotating body 52 to rotate. The housing 51 is fixed to the first support plate 22, and the rotating body 52 is connected to the rotating beam 3. In this embodiment, the driving device 5 and the rotating beam 3 are arranged in the receiving cavity 24, resulting in a compact structure, with small occupied space, fewer components, reduced risk of jamming, easy installation, and low maintenance costs.

Referring to FIG. 4, in this embodiment, the driving device 5 comprises a rotary drive, which comprises a housing 51 and a worm-gear mechanism provided inside the housing 51. The worm-gear mechanism comprises a worm and a worm wheel meshing with the worm. The worm wheel constitutes the rotating body 52, and the worm is connected to the motor's driving end. In this embodiment, the driving device 5 adopts a worm-gear type rotary drive. The housing 51 comprises a first housing 511 that accommodates the worm and a second housing 512 that accommodates the worm wheel. The rotating body 52 is provided at one end of the second housing 512 and is connected to the rotating beam 3. The other axial end of the second housing 512 is fixed to the first support plate 22, which improves the radial and axial load-bearing capacity of the driving device 5.

Additionally, it has a reverse self-locking function and can withstand lateral and vertical forces transmitted by the flexible bearing body.

Referring to FIG. 2 and FIG. 3, in some embodiments, the first support plate 22, the second support plate 23, and the rotating beam 3 each have corresponding through-holes 25. A first bolt 6 is inserted from one side of the first support plate 22 sequentially through a through-hole 25 of the first support plate 22, the driving device 5, a through-hole 25 of the rotating beam 3, and a through-hole 25 of the second support plate 23, and then fastened. In this way, the first support plate 22 and the second support plate 23 are connected by the first bolt 6. In this embodiment, the first support plate 22 is connected to the second support plate 23 by the first bolt 6, so the two support plates jointly bear lateral forces, improving the lateral resistance of the base 2. The first bolt 6 passes through the through-hole 25 of the first support plate 22, the driving device 5, the through-hole 25 of the rotating beam 3, and the through-hole 25 of the second support plate 23. Thus, the force exerted by the housing 51 of the driving device 5 on the first support plate 22 is transmitted to the second support plate 23 via the first bolt 6, ensuring that the first support plate 22 and the second support plate 23 jointly bear the force, avoiding local stress concentration on the base 2, resulting in less deformation of the base 2, and improving the load-bearing capacity of the base 2.

Referring to FIG. 2 to FIG. 5, in the above embodiments, a bearing 7 is provided in the through-hole 25 of the second support plate 23. The bearing 7 features a bearing cavity 71. A sleeve 8 is fixedly provided in the through-hole 25 of the rotating beam 3, and both ends of the sleeve 8 extend beyond the rotating beam 3. The first bolt 6 passes through the inside of the sleeve 8, with one end of the sleeve 8 inserted into the bearing cavity 71 and able to rotate around the axis of the through-hole 25 on the second support plate 23. Preferably, the part of the sleeve 8 extending beyond the rotating beam 3 is welded to the edge of the through-hole 25 of the rotating beam 3.

In this embodiment, the bearing and the sleeve are configured in a way that the first bolt only needs to bear a tensile force, without bearing a vertical shear force. The stress state is simple, eliminating the risk of the first bolt being damaged under complex stress conditions. Simultaneously, the sleeve and the bearing can reduce the deformation of the base and the friction with the through-hole on the second support plate when the rotating beam rotates, making the rotation stable and smooth.

Referring to FIG. 2 to FIG. 5, in the above embodiments, the bearing 7 comprises a circular column section 72 and a first annular section 73 provided on the outer wall of one end of the circular column section 72. The outer diameter of the first annular section 73 is greater than the diameter of the through-hole 25 on the second support plate 23. The circular column section 72 is inserted into the through-hole 25 on the second support plate 23 from the receiving cavity 24, and one end of the sleeve 8 is inserted into the bearing cavity 71, with the rotating beam 3 and the first annular section 73 able to restrict the axial movement of the bearing 7.

Figure 6:
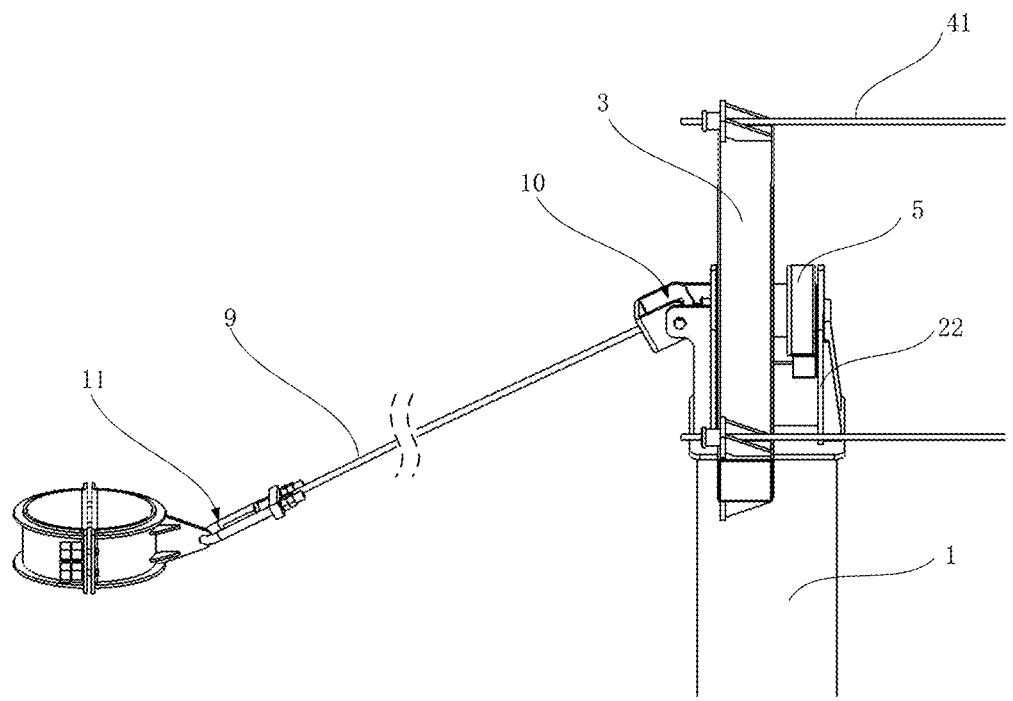
FIG. 6 is a schematic of a diagonal cable connection in this disclosure.

Referring to FIG. 1 and FIG. 6, in some embodiments, the flexible tracking bracket also comprises a diagonal cable 9. One end of the diagonal cable 9 is connected to the second support plate 23, and the other end is connected to the base surface. One end of the diagonal cable 9 is connected to the second support plate 23 and exerts a pulling force on the second support plate 23. The force borne by the second support plate 23 is partially transmitted to the first support plate 22 via the first bolt 6, causing the entire base 2 to bear the force jointly, avoiding local stress concentration on the base 2, and improving the load-bearing capacity of the base 2.

In this embodiment, the diagonal cable is configured can enhance the overall tensile capacity of the flexible tracking bracket, reduce the requirements for the load-bearing capacity of the column and the base, save materials, and reduce costs.

Referring to FIG. 6, in the above embodiments, the diagonal cable 9 is connected to the second support plate 23 via a first connection structure 10 and connected to the base surface via a second connection structure 11. One end of the diagonal cable 9 is connected to the second support plate 23 and exerts a pulling force on the second support plate 23. The force borne by the second support plate 23 is partially transmitted to the first support plate 22 via the first bolt 6, causing the entire base 2 to bear the force jointly, avoiding local stress concentration on the base 2, and improving the load-bearing capacity of the base 2. In this embodiment, the first connection structure 10 and the second connection structure 11 are configured to reduce stress concentration, making the force distribution at both ends of the diagonal cable 9 uniform, reducing the risk of a detachment of the diagonal cable 9 and the deformation of the base 2.

In some embodiments, the rotating body 52 is connected to the side of the rotating beam 3 through a connecting piece.

Referring to FIG. 2 to FIG. 4, in the above embodiments, the connecting piece is a flange 12. One end of the flange 12 is fixedly connected to the rotating body 52 via one or more second bolts, and the other end is welded to a side of the rotating beam 3.

In this embodiment, the flange 12 is connected to the rotating body 52 via second bolts, facilitating installation and disassembly. Welding to the rotating beam 3 avoids weakening the cross-sectional strength by connecting through-holes on the rotating beam 3.

In some embodiments, the connecting piece is a hollow tube. The side wall of the rotating beam 3 facing the driving device 5 is provided with a protrusion, which is inserted into the hollow tube and fixed by a fastener that passes through the protrusion and the side wall of the hollow tube.

In this embodiment, the protrusion provided on the rotating beam 3 can be integrally formed with the rotating beam 3 or pre-welded onto the rotating beam. The fastener can be, but is not limited to, a bolt, a rivet, or a pin, reducing on-site installation procedures and facilitating disassembly and maintenance.

It should be noted that the above embodiments may be freely combined as needed. The above are only preferred embodiments of this disclosure. It should be pointed out that for those skilled in the art, several improvements and modifications can be made without departing from the principle of this disclosure. These improvements and modifications should also be regarded as the protection scope of this disclosure.

The invention claimed is:

1. A flexible tracking bracket, characterized by comprising:
   a plurality of columns spaced apart on a base surface;
   a plurality of bases, wherein each base of the bases is provided at a top of one of the plurality of columns;
   rotating beams, pivotally arranged on the bases;
   flexible bearing bodies, comprising at least two bearing cables, wherein each of the bearing cables is connected between two adjacent rotating beams of the rotating beams, and the flexible bearing bodies are used to support photovoltaic modules;
   driving devices, wherein each base is equipped with a driving device of the driving devices, and each of the driving devices comprises a driving end, connected to a corresponding rotating beam of the rotating beams, and the driving devices synchronously drive the rotating beams to rotate;
   wherein each of the bases comprises a base plate and a first support plate vertically arranged on one side of the base plate, and each of the driving devices is arranged close to the first support plate of a corresponding base of the bases,
   wherein each of the driving devices comprises a housing a rotating body arranged within the housing that can rotate relative to the housing, and a motor mounted on the housing, wherein the motor is used to drive the rotating body to rotate, and the housing is fixed on the first support plate of the corresponding base, and the rotating body is connected to the corresponding rotating beam, and
   each of the driving devices comprises a rotary drive, wherein the rotary drive comprises the housing and a worm-gear mechanism arranged within the housing, and the worm-gear mechanism comprises a worm and a worm wheel meshing with the worm, and the worm wheel constitutes the rotating body, and the worm is connected to a driving end of the motor, and wherein each of the bases further comprises a second support plate and the first support plate and the second support plate are both vertically arranged on two sides of the base plate; wherein the first support plate, the second support plate, and the base plate constitute a receiving cavity, and each of the driving devices and at least a part of the corresponding rotating beam are arranged within the receiving cavity, and the corresponding rotating beam is arranged close to the second support plate of the corresponding base.

2. The flexible tracking bracket according to claim 1, characterized in that,
   the first support plate, the second support plate, and the corresponding rotating beam of each of the bases are respectively provided with a through-hole wherein the through-holes are corresponding to each other, and a first bolt is inserted from one side of the first support plate sequentially into the through-hole of the first support plate, the driving device, the through-hole of the rotating beam, and the through-hole of the second support plate, and then fastened, thus the first support plate and the second support plate are connected by the first bolt.

3. The flexible tracking bracket according to claim 2, characterized in that,
   the through-hole of the second support plate is provided with a bearing, wherein the bearing features a bearing cavity, and a sleeve is fixed within the through-hole of the rotating beam, and two ends of the sleeve extend beyond the corresponding rotating beam, and the first bolt passes through an inside of the sleeve, and one end of the sleeve is inserted into the bearing cavity, and is configured to rotate around an axis of the through-hole of the second support plate.

4. The flexible tracking bracket according to claim 3, characterized in that,
   the bearing comprises a circular column section and a first annular section provided on an outer wall of one end of the circular column section, wherein an outer diameter of the first annular section is greater than a diameter of the through-hole of the second support plate, and the circular column section is inserted into the through-hole of the second support plate from the receiving cavity, then one end of the sleeve is inserted into the bearing cavity, and the corresponding rotating beam and the first annular section is configured to restrict an axial movement of the bearing.

5. The flexible tracking bracket according to claim 1, characterized by further comprising a diagonal cable, wherein one end of the diagonal cable is connected to the second support plate, and another end of the diagonal cable is connected to a base surface.

6. The flexible tracking bracket according to claim 5, characterized in that, the diagonal cable is connected to the second support plate through a first connection structure and connected to the base surface through a second connection structure.

7. The flexible tracking bracket according to claim 1, characterized in that, the rotating body is connected to a side of the corresponding rotating beam through a connecting piece.

8. The flexible tracking bracket according to claim 7, characterized in that, the connecting piece is a flange, wherein one end of the flange is fixedly connected to the rotating body through one or more second bolts, and another end is welded to the side of the corresponding rotating beam.

* * * * *